April 4, 1967  D. HULLSTRUNG ET AL  3,312,719
PROCESS FOR OXIDIZING HYDROCARBONS
Filed Jan. 14, 1964
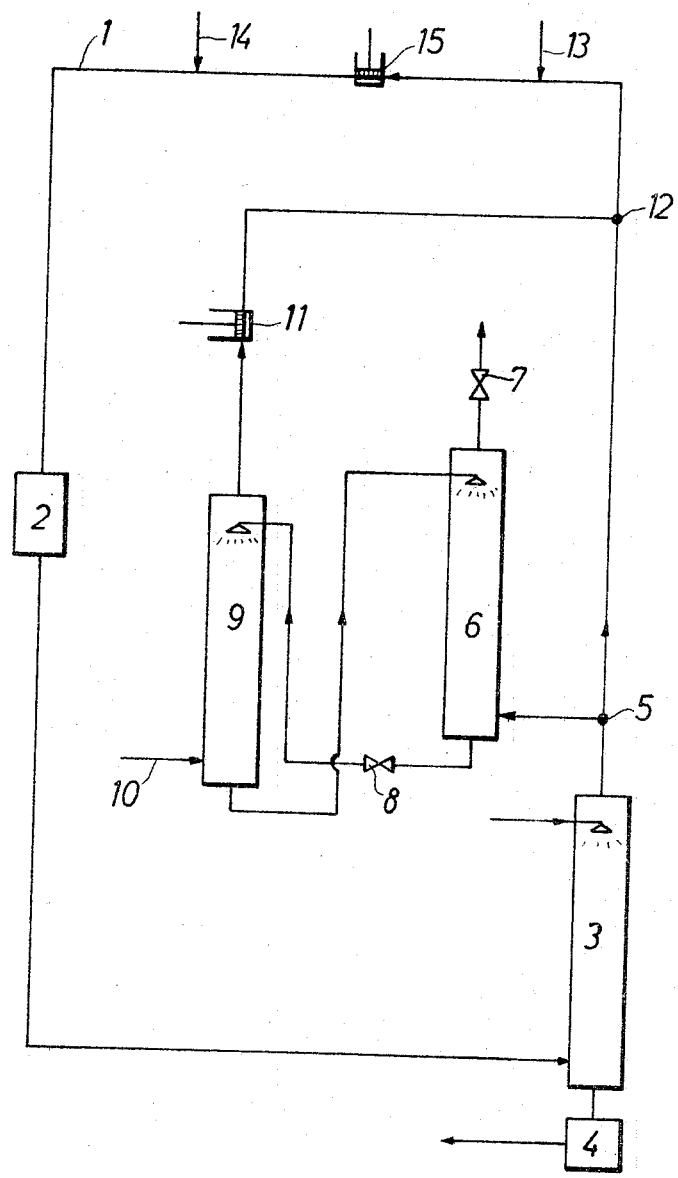
INVENTORS:
DIETER HÜLLSTRUNG, HANS HABERLAND, HEINRICH KUNZE,
HERMANN HEINZ.
BY
*Burgess, Dinklage & Sprung*
ATTORNEYS 3,312,719
PROCESS FOR OXIDIZING HYDROCARBONS
Dieter Hüllstrung and Hans Haberland, Leverkusen, Heinrich Kunze, Cologne-Stammheim, and Hermann Heinz, Leverkusen, Germany, assignors to Farbenfabriken Bayer Aktiengesellschaft, Leverkusen, Germany, a corporation of Germany
Filed Jan. 14, 1964, Ser. No. 337,556
Claims priority, application Germany, Jan. 18, 1963, F 38,793
8 Claims. (Cl. 260—348.5)

This invention relates to an improved process for oxidizing hydrocarbons.

It is known, that aliphatic hydrocarbons can be oxidized with molecular oxygen, for example, converting ethylene to ethylene oxide. In this process, air or oxygen is employed as the oxidizing agent, operating with an excess of the hydrocarbon to be oxidized. Consequently, the unreacted hydrocarbon must be recycled after removal of the desired oxidation products. In processes of this type, it is necessary to separate the reaction products and the inert gases possibly introduced into the cycle with the reaction components, partly or entirely from the unreacted hydrocarbon, since otherwise these materials would accumulate in the cycle and would stop the reaction.

The desired reaction products are extracted from the reaction mixture mostly by absorption in suitable solvents or by condensation or similar processes. The carbon oxides, which in many oxidation processes are formed as by-products, must be removed by means of special absorption methods. In general, inorganic or organic alkaline absorption liquors are suitable for absorbing carbon dioxide. Carbon monoxide can be extracted with acid or alkaline solutions of copper salts under pressure. Thus, both these oxides of carbon require separate processes. It has also been proposed already to oxidize the carbon monoxide first on catalysts with molecular oxygen at low temperatures and to absorb the carbon dioxide here formed together with the carbon dioxide produced during the oxidizing process itself in alkalis. This method involves an additional, likewise oxygen-consuming step.

Another problem arising in most of the known oxidizing processes is constituted by the removal of the inert gases introduced together with the starting components. This comprises also the impurities of the hydrocarbon to be oxidized, insofar as these are not oxidized during the reaction, as well as the inert gases introduced with the air or with the oxygen-containing gas mixtures where the latter are employed as oxidizing agents.

It has now been found, that the aforementioned difficulties can be avoided and that lower saturated or simply unsaturated hydrocarbons can be oxidized in an especially economic manner with gaseous oxygen, operating with an excess of the hydrocarbon to be oxidized and recycling the unreacted hydrocarbon after separation of the desired oxidation products, by extracting from the residual gas the hydrocarbon to be recycled with a higher-boiling hydrocarbon and by blowing out said dissolved hydrocarbon from the washing liquor with the air or with the oxygen-containing gas employed for oxidizing the lower hydrocarbon and recycling the gas mixture thus obtained after adding the components consumed during the oxidation.

The lower aliphatic hydrocarbons concerned are preferably aliphatic hydrocarbons having up to 5 carbon atoms, such as ethylene, propylene, butylene or hydrocarbon mixtures containing further components such as $C_2$- or $C_3$-fractions, for example.

The absorption can be effected under normal or elevated pressure. In this connection, it has been surprisingly found that the solubility of propylene, for example, increases more strongly with increasing pressure than predicted by Henry's law. Owing to this, a particular advantage of the process of the invention accrues by effecting the absorption under elevated pressure.

The temperature of the absorption should be kept as low as possible. Expediently, the operation is carried out at room temperature wherever possible or slightly lower temperatures e.g., 10° C. Temperatures above 50° C. are unfavourable. If necessary, the heat of dissolution can be reduced by cooling.

Expediently, the desorption is to be effected at a lower pressure than the absorption. If, for example, the absorption has been effected at elevated pressure, the desorption will be advantageously carried out at normal pressure. In general, it is not necessary to apply pressures above about 50 atmospheres.

Suitable solvents for the process of the invention are all high-boiling, aromatic, aliphatic, alkylaromatic and naphthenic hydrocarbons which are inert under the conditions of the process according to the invention. It is of advantage if the solvents have a low vapour pressure, preferably a vapour pressure smaller than about 15 torr, preferably smaller than 2 torr, at room temperature. Mixtures of such hydrocarbons are also suitable. The most suitable are of course such solvents which, under the conditions of their application according to the invention, have a very low vapour pressure, so that as small portions as possible pass into the gas mixture leaving on desorption. If the gas mixture is subsequently recompressed to a substantially higher reaction pressure, a portion of the washing hydrocarbon will again separate in liquid form, so that for a higher pressure differential a higher vapour pressure has to be accepted. In particular, there may be employed such solvent mixtures as those obtained in the technical distillation in the petroleum industry, which are especially advantageous from the point of view of prices. There may be mentioned above all diesel oils, fuel oils and similar products.

The solvent employed in the absorption step may be recycled. Losses are made good either periodically or continuously.

Air is primarily employed as the blowout-gas; however, other oxygen-containing gas mixtures may also be employed as long as they are also suitable for the subsequent oxidation of the hydrocarbon.

The following two serious objections could be made against the use of oxygen-containing gas mixtures for blowing out the lower hydrocarbon: Firstly, the danger of peroxide formation in the washing agent and, secondly, that the explosive range is exceeded by mixing the hydrocarbon to be blown out with the oxygen-containing blowout gas. That the process according to the invention can be carried out in spite of these objections is shown by the following considerations:

The process according to the invention will be illustrated by the example where air is employed as the oxidizing and blowout gas and diesel oil is used as washing agent, the lower hydrocarbon to be oxidized being propylene. It was to be expected that the diesel oil will form peroxides on prolonged contact with the air and that these peroxides would accumulate in continuous operation. In an extended experiment, in which diesel oil was employed for blowing out propylene with air in a cyclic process, the formation of peroxides was in fact observed. After an induction period of 70 hours, during which no peroxide could be detected, the concentration of peroxidic oxygen increased within 48 hours to 0.002 mol active oxygen per kg. of diesel oil and diminished in the course of the following 100 hours to 0.0012 mol per kg.

The peroxide concentration did not change in the course of several hundreds of hours. Small concentrations of heavy metal ions do not change this condition.

Thus, surprisingly, an enrichment in peroxides does not take place.

It is further known, that propylene forms with air an explosive mixture within certain limits (2–11% propylene in air). This range is exceeded in all cases during the desorption. For the desorption there will be normally employed a packed or a tray column. It is thus possible to calculate without difficulty on which of the theoretical trays this explosive range is prevailing.

This has been calculated for Example 1 (preparation of propylene oxide) and an ignition source (Bosh spark-plug) and a sampling point were built into the desorption column at the place calculated (see flow chart of Example 1). The gas sample taken in continuous operation agreed with the calculated concentration (7–9 mol percent propylene in air). The spark plug was then switched on, the functioning of which could be observed. No explosion occurred. The differential pressure gauge showed no pressure oscillations. Thus, surprisingly, the gas mixture does not ignite during the washing process in the presence of the diesel oil, so that there is no danger.

The use of high-boiling hydrocarbons for absorbing the lower hydrocarbon to be recovered with subsequent blowing out of the hydrocarbon with the gas required for oxidation renders possible the use of air or of oxygen-containing gas mixtures for such oxidation processes as well in which the hydrocarbon to be oxidized is only partially converted and therefore has to be recovered. Thus, the combination of two important steps results in a technologically valuable process.

It can be expedient not to free the whole of the recycled residual gas from the gases not participating in the oxidation process, but rather to free portions of the recycled residual gas from the inert components at a time.

*Example 1*

The process will now be explained on hand of the example of the direct oxidation of propylene to propylene oxide and acetaldehyde, using the apparatus illustrated schematically in FIG. 1.

A gas mixture consisting, for example, of 45% by volume of propylene, 5% by volume of oxygen (the remainder being nitrogen, carbon dioxide and carbon monoxide) is subjected, over the pipe 1, to a direct oxidation of the propylene to propylene oxide at 8 atmospheres absolute. The reaction mixture here obtained is cooled to 50° C. and is then washed with water in the washer 3, where all water-soluble reaction products such as propylene oxide, acetaldehyde, aceton, acrolein, ethylene oxide, a part of the carbon dioxide, etc., are washed out. The washing water then flows into a distillation unit 4, wherein the individual reaction products are obtained in the pure state. The washing water freed from the reaction products flows, wholly or in part, back to the washer 3.

In addition to propylene, the washed gas contains nitrogen, carbon dioxide, carbon monoxide and other components. It is divided at 5. In this example, 56% of the gas go directly to the circulating compressor 15. 44% pass into the absorber 6 and are there washed countercurrent with diesel oil. The amount of diesel oil (1 liter per 44 g. of material to be dissolved) is so determined that the whole of the propylene is dissolved. The inert gases, such as carbon dioxide, carbon monoxide, nitrogen and others pass through practically undissolved, are expanded at 7 and leave the plant. The diesel oil charged with the hydrocarbon is expanded at 8 and passe to the desorber 9. In this example, the desorber operates at normal pressure. A portion of the dissolved propylene bubbles out immediately after the expansion and flows to the partial stream compressor 11. The remainder of the dissolved hydrocarbon is blown out with air which enters the desorber at 10. The air blown in and the totality of the propylene blown out are brought again to the operating pressure of the plant by means of the compressor 11 and returned to the main cycle at 12. The amount of the air blown in at 10 is so determined that, to avoid explosion risks, the oxygen content does not exceed 11% by volume prior to 12.

The propylene consumed is placed at 13, so that the pressure remains constant within the installation, while at 14 the oxygen content of the circulating gas is replenished up to 5 volume percent with air.

Instead of propylene, it is also possible to use propane or propylene-propane mixtures. Propane is dissolved in the absorber in the same way as propylene.

Instead of air, oxygen-containing gas mixtures can also be employed at 10 and 14, for example, oxygen-nitrogen mixtures with an oxygen content different of that of the air. Optionally, pure oxygen may also be introduced at 14. The compositions of the partial streams must then be altered accordingly.

Although diesel oil has proven to be particularly satisfactory as washing liquid for the hydrocarbon, other hydrocarbon fractions with similar boiling range and similar solubility can also be employed. Diesel oil has the advantage of being extremely cheap and easy to procure. Consequently, small losses caused by small portions of lower-boiling products are of no importance. These portions can be replaced by fresh diesel oil, without affecting the economic balance of the process. Similar applies to the contamination of the diesel oil occurring with time. The diesel oil is then replaced wholly or in part. The contaminated diesel oil can then be employed for heating purposes, according to its thermal value.

*Example 2*

To prepare ethylene oxide from ethylene and air in a cyclic process, a gas mixture consisting of 15% by volume of ethylene, 9% by volume of oxygen, 4% by volume of carbon dioxide and 72% by volume of nitrogen, being under a pressure of 15 atmospheres absolute, are passed over a silver catalyst at 250–300° C. The ethylene is reacted to 40%, forming ethylene oxide with a yield of 68%. The reaction gases are cooled and subjected to a washing with water, whereby the ethylene oxide and the water formed as well as a portion of the carbon dioxide are washed out. The gas mixture leaving the washing column is composed of 10.1 volume percent ethylene, 0.8 volume percent oxygen, 8.6 volume percent carbon dioxide and 80.5 volume percent nitrogen. From this gas stream, a side stream amounting to 48% is taken off and fed to the sump of a washing column operated with diesel oil at the pressure of the side stream (about 15 atmospheres). In this washing column, the ethylene is practically completely dissolved in the diesel oil, while the remaining components of this side stream leave the top of the column practically intact. Thus, the composition of the gas mixture leaving the column head is 0.9 volume percent oxygen, 9.5 volume percent carbon dioxide and 89.6 volume percent nitrogen, approximately. This gas mixture can be separated from the carbon dioxide by known processes, whereby great amounts of a nitrogen practically free from oxygen are obtained.

The diesel oil charged with ethylene leaving the sump of the washing column, after expanding it to normal pressure, is fed to the head of a desorption column, through which air is blown from the bottom. The amount of the air is so determined, that the mixture of ethylene and air leaving the top of the desorption column has an oxygen content of less than 14 volume percent. This will be the case, for example, when the normal volume ratio of the side stream to the air blown in is of 4.28 or greater.

The diesel oil leaving at the sump of the desorption column, which is practically free of dissolved ethylene, is recycled by means of a pump to the head of the washing column.

The gas mixture leaving the top of the desorption column is then compressed to 15 atmospheres and reunited with the main gas stream behind the side-stream derivation. After this recombination, the composition of the gas is, approximately, 14.8 volume percent ethylene, 4.1 volume percent oxygen, 6.6 volume percent carbon dioxide and 74.5 volume percent nitrogen. The ethylene consumed during the oxidation reaction is now topped up in this gas mixture which is under a pressure of 15 atmospheres, and so much air is added thereto that the oxygen content of the resulting gas mixture amounts to 9 volume percent. This will be the case, for example, when the normal volume ratio of the air blown into the desorption column to the air blown into the main gas stream has a value of not greater than 0.3.

The aforedescribed steps finally yield a gas mixture which is quantitatively and qualitatively identical to the gas mixture mentioned in the first paragraph of this example. The gas mixture is fed back to the oxidation reactor with the aid of a circulating compressor.

*Example 3*

To prepare acetaldehyde and acrolein from butylene and air in a cyclic process, a gas mixture consisting of 10.5 volume percent butylene, 5.9 volume percent oxygen, 7.5 volume percent carbon dioxide and 76.1 volume percent nitrogen are passed over a catalyst at normal pressure and 400–450° C. 6% of the butylene are converted, acetaldehyde and acrolein being formed with a yield of 53%.

The reaction gases are cooled and subjected to a washing with water, whereby the acetaldehyde, the acrolein, the water formed and a portion of the carbon dioxide produced are washed out. The gas mixture leaving the washing column has an approximative composition of 10 volume percent butylene, 3.8 volume percent oxygen, 8.8 volume percent carbon dioxide and 77.4 volume percent nitrogen.

A side stream amounting to 13% of the total is taken off from this gas mixture. The side stream is compressed with the aid of a compressor to 10 atmospheres and fed at this pressure to the sump of a washing column which is operated with light fuel oil as the washing agent. Here, the butylene is practically totally dissolved in the light fuel oil, while the remaining components of the side stream leave the top of the column practically intact. This gas mixture is composed of 4.3 volume percent oxygen, 9.8 volume percent carbon dioxide and 85.9 volume percent nitrogen.

The light fuel oil leaving the sump of the column, which is charged with butylene, is fed, after expansion to normal pressure, to the top of a desorption column, through which air is blown from the bottom. The amount of the air is so determined that the gas mixture leaving the desorption column contains 9.3% butylene. Such a mixture is outside the explosion range. The gas mixture is now united with that part of the main gas stream which has not been lead through the oil wash. After this step, the approximative composition of the gas is 9.9 volume percent butylene, 5.9 volume percent oxygen, 7.5 volume percent carbon dioxide and 76.7 volume percent nitrogen. If now to this mixture there is added an amount of butylene corresponding to the amount consumed, then a gas mixture will be obtained which is identical to the mixture mentioned in the first paragraph of this example with regard to quantity and composition. The mixture is returned to the reactor with the aid of a gas circulating pump.

Under "light fuel oil" there is understood a mixture of hydrocarbons which is designated in Great Britain as "fuel oil," especially "Domestic No. 2" or "Industrial No. 2." In Germany the product is defined by DIN 51603 and in the United States by "Federal Specification VV-F-815 for Burner Fuel Oil," Grade F.S. No. 2.

*Example 4*

The procedure described in Example 3 was carried out exactly in the same manner with the only difference that instead of the light fuel oil there was used as washing liquid n-tetradecane $C_{14}H_{30}$. The absorption and desorption were carried out in the same manner as described in Example 3 and similar results as described therein were obtained. The loss of n-tetradecane (in consequence of the vapour pressure of this solvent) was after 100 working hours less than 1 percent of the solvent introduced.

Similar results are obtained by using the following compounds instead of the n-tetradecane as washing liquid: n-octylbenzene $C_{14}H_{22}$, 1-hexadecene $C_{16}H_{32}$, 1,3,5-triethylbenzene $C_{12}H_{18}$, n-tetradecylcyclopentane $C_{19}H_{38}$, 1,2-dimethylnaphthalene $C_{12}H_{12}$ and n-octylcyclohexane $C_{14}H_{28}$. All these solvents show sufficient solvent properties and good resistance against oxidation and remain liquid under the working conditions.

*Example 5*

A gas mixture consisting of 35 volume percent propane, 15 volume percent propylene, 10 volume percent oxygen and 40 volume percent nitrogen are oxidized to propylene oxide at a pressure of 8 atmospheres. The reaction mixture is then cooled and washed with water under pressure as described in Example 1.

The washed gas obtained contains mainly propane, propylene, nitrogen and about 4 volume percent CO. The entire amount of gas is introduced into an absorption column which works at 8 atmospheres. 1,6-dimethylnaphthalene is used as absorption liquid and is introduced at the top of the absorption column (about 1 liter of solvent per 60 grams of hydrocarbon contained in the gas). The entire hydrocarbon is dissolved in the solvent while the CO and the nitrogen are leaving the absorption column overhead. They can be worked up to the pure compounds according to known methods.

The 1,6-dimethylnaphthalene which contains the low-boiling hydrocarbons is introduced by a pump into the top of a pressure desorber which works as the absorption column at a pressure of 8 atmospheres. Furthermore there are introduced into the top of the pressure desorber such amounts of the hydrocarbon mixture to be oxidized which has been used up in the aforementioned oxidation. Into the sump of the pressure desorber there is introduced air at a pressure of 8 atmospheres in such an amount that it contains about 40% of the oxygen used up in the direct oxidation of the hydrocarbons. If an entire amount of 10 Nm³/hour oxidation gas is needed then, for example, 2 Nm³/hour are introduced. The gas mixture leaving overhead has then an oxygen content of about 10 volume percent. At the sump of the pressure desorber there is removed the 1,6-dimethylnaphthalene used as washing liquid which contains a small amount (about 44 grams/liter) of the propane-propylene mixture dissolved in the absorber. This liquid is depressurized in a second desorption column which works at a pressure of 2 atmospheres. Into the sump of this desorption column there is introduced air at a pressure of 2 atmospheres to about 60% of the oxygen used in the oxidation. These are, if about 10 Nm³/hour oxidation gas are used, about 3 Nm³/hour air. The hydrocarbon-air mixture leaving the desorber overhead has an oxygen content of 10 volume percent. This gas mixture is pressurized to 8 atmospheres, then united with the gas stream leaving the first desorption column and is then introduced into the oxidation reactor. The gas mixture has the composition given at the beginning of this example.

The washing liquid, the 1,6-dimethylnaphthalene, which leaves the sump of the second desorption column is recycled to the top of the absorption column.

*Example 6*

Ethylene oxide is obtained by direct oxidation of ethylene and air in a cyclic process from a gas mixture containing 15 volume percent ethylene, 9 volume percent oxygen, 4 volume percent carbon dioxide and 72 volume percent nitrogen. The gas mixture is under a pressure of 15 atmospheres and at a temperature of 250–300° C. and the oxidation is carried out over a silver catalyst. 40% of the ethylene are reacted giving ethylene oxide in a 68% yield. The reaction gases are cooled and washed with water. Thereby the ethylene oxide, the water formed and part of the carbon dioxide are washed out. The gas mixture leaving the washing column has the following composition: about 10.1 volume percent ethylene, about 0.8 volume percent oxygen, about 8.6 volume percent carbon dioxide and about 80.5 volume percent nitrogen. From this gas stream 48% are taken off, pressurized to 50 atmospheres and introduced into the sump of a washing column wherein diesel oil is used as washing liquid. Per kg. of ethylene introduced there are introduced as washing liquid about 70 liters of diesel oil. The ethylene is dissolved practically entirely in the diesel oil while the residual components of the gas stream are leaving the washing column overhead.

The diesel oil leaving the sump of the washing column which contains the ethylene is introduced into the top of a desorption column which works at a pressure of 4 atmospheres while air is introduced into the bottom of this column. The amount of air introduced is regulated in such a manner that the gas mixture leaving the desorption column overhead has an oxygen content of less than 14 volume percent. This gas mixture leaving the desorption column overhead is brought to a pressure of 15 atmospheres and introduced again into the recycle gas from which it has been taken off. Thereafter there is added the amount of ethylene used up in the oxidation reaction and furthermore air is introduced until the oxygen content of the gas mixture is 9 volume percent. The gas mixture corresponds then again to the gas mixture mentioned above for the direct oxidation of the ethylene and is used again for the oxidation.

The diesel oil leaving the sump of the desorption column is recycled to the top of the washing column.

Under "diesel oil" there is understood a mixture of hydrocarbons which is designated in Great Britain as "high speed diesel fuel" or "diesel fuel oil." The product is defined in Germany by DIN 51601 and in the United States by "Federal Specification VV-F-800 for Diesel Fuel Oil," Grade DF-2.

We claim:

1. In the process for oxidizing an aliphatic hydrocarbon having up to 5 carbon atoms selected from the group consisting of mono-unsaturated, saturated, and mixtures of mono-unsaturated and saturated compounds with a gas-containing molecular oxygen, utilizing in said oxidizing an excess of said lower aliphatic hydrocarbon and recycling the unreacted lower aliphatic hydrocarbon after separation of the principal oxidation products therefrom, the steps of extracting at least a portion of said lower aliphatic hydrocarbon from the main gas stream with a higher boiling hydrocarbon which is at least one member selected from the group consisting of liquid aliphatic, aromatic, alkyl aromatic, and naphthenic hydrocarbons, the vapor pressure of which at room temperature does not exceed 15 torr as washing liquid, at a temperature not exceeding 50° C. and at a pressure of up to 50 atmospheres, thereafter blowing out the lower hydrocarbon dissolved in said washing liquid with a gas-containing molecular oxygen at a pressure lower than the pressure employed in said extracting, utilizing said gas-containing molecular oxygen for said blowing in an amount whereby explosive mixtures are not formed, and re-cycling the gas mixture thus obtained back to the oxidizing step following adjustment thereof to attain the composition of the initial gas mixture.

2. Process according to claim 1, which comprises extracting only a portion of the gas stream with said washing liquid.

3. Process according to claim 1, which comprises employing as washing liquid at least one member selected from the group consisting of diesel oil, fuel oil and 1,6-dimethylnaphthalene.

4. Process according to claim 1, wherein said lower aliphatic hydrocarbon is propylene and said washing liquid is diesel oil.

5. Process according to claim 1, wherein said lower aliphatic hydrocarbon is a mixture of propylene and propane and said washing liquid is diesel oil.

6. Process according to claim 1, wherein said lower aliphatic hydrocarbon is ethylene and said washing liquid is diesel oil.

7. Process according to claim 1, wherein said lower aliphatic hydrocarbon is butylene and said washing agent is light fuel oil.

8. Process according to claim 1, wherein said lower aliphatic hydrocarbon is a mixture of propane and propylene and said washing liquid is 1,6-dimethylnaphthalene.

No references cited.

WALTER A. MODANCE, *Primary Examiner.*

NICHOLAS S. RIZZO, *Examiner.*

NORMA S. MILESTONE, *Assistant Examiner.*